United States Patent [19]

Sone et al.

[11] 3,999,846
[45] Dec. 28, 1976

[54] INFORMATION SEARCH DEVICE

[75] Inventors: Yoshiharu Sone, Tokyo; Fumio Ueno, Kawasaki, both of Japan

[73] Assignee: Canon Kabushiki Kaisha, Tokyo, Japan

[22] Filed: July 21, 1975

[21] Appl. No.: 597,908

Related U.S. Application Data

[63] Continuation of Ser. No. 433,998, Jan. 17, 1974, abandoned.

[30] Foreign Application Priority Data

Jan. 26, 1973 Japan .............................. 48-10836

[52] U.S. Cl. ......................... 353/26 A; 235/92 DN; 235/61.11 E; 250/570
[51] Int. Cl.² .......................................... G03B 23/12
[58] Field of Search ...................... 353/25, 26, 120; 235/92 DN, 92 MP, 61.11 E; 250/555, 570

[56] References Cited

UNITED STATES PATENTS

| | | | |
|---|---|---|---|
| 3,290,987 | 12/1966 | James et al. ......................... | 353/26 |
| 3,700,320 | 10/1972 | Brewer et al. ....................... | 353/26 |
| 3,741,645 | 6/1973 | Hollwedel et al. .................. | 353/26 |
| 3,744,890 | 7/1973 | Suzuki et al. ....................... | 353/26 |
| 3,778,630 | 12/1973 | White et al. ...................... | 353/26 A |
| 3,802,614 | 4/1974 | Russell et al. ....................... | 353/26 |

*Primary Examiner*—Henry K. Artis
*Assistant Examiner*—John W. Shepperd
*Attorney, Agent, or Firm*—Fitzpatrick, Cella, Harper & Scinto

[57] ABSTRACT

In an information search device for searching for any desired information in a film provided with a series of information frames, frame index marks and document index marks formed along the information frames on the opposite sides thereof, there is provided a drive motor for transporting the film, a light source system for irradiating the film, a photoelectric converter element for detecting the frame index marks, a second photoelectric converter element for detecting the document index marks, a gate circuit for receiving the detection signals from the converter elements to selectively pass one of those detection signals, a counter for counting the detection signals passed through the gate circuit, and a brake mechanism for stopping the transport of the film when the counter has counted up a number of detection signals corresponding to the search number of the desired information.

8 Claims, 6 Drawing Figures

INFORMATION SEARCH DEVICE

This is a continuation of application Ser. No. 433,998, filed Jan. 17, 1974, now abandoned.

BACKGROUND OF THE INVENTION

1. Field of the Invention

This invention relates to an information search device for automatically searching for any desired one of information frames recorded in a long-footage film.

2. Description of the Prior Art

Microfilm has been finding versatile uses because it is capable of recording therein a great deal of information at a very high density in a very much limited space. For example, various documents such as technical papers, patent specifications, data, catalogues, newspapers, etc. have been photographed in microfilm to a reduced scale for storage and reuse.

However, utility of the microfilm having a great deal of information recorded therein depends on the perfection of a method of searching for the recorded information.

To search for a desired frame of information recorded in the microfilm, a well-known method involves the steps of providing the microfilm with search marks for signals outwardly of respective information frames, counting these marks during transport of the microfilm to thereby count the number of the transported frames, and then checking such number of the frames with the consecutive number of the desired frame to thereby search for the desired information frame. According to this method, search is usually effected on the basis of a frame unit and therefore, when search is to be effected for a document unit or group comprising a series of contiguous information frames, either the relation between the desired individual frame and the group of information frames must be known with the aid of a special index or like means before or after the desired frame has been searched for, or the microfilm must be additionally provided with search codes formed in a black-and-white bit pattern between adjacent frames, such codes representing the content of the information frames and the content of the document units, and the search codes must be decoded to search for a desired document unit. In the former case, the need to provide for the special index or like means and the need to check up the relation between the individual frame and the frame group with the aid of the special index has made the searching operation cumbersome and complex and accordingly time consuming, and moreover, the search might result in finding of a wrong frame. In the latter case, the search for a document unit presupposes the provision of complicated search codes which involves very much complicated procedures of photographic recording and which also leads to an increased size and complexity of the device for detecting the complicated search codes.

SUMMARY OF THE INVENTION

It is therefore an object of the present invention to provide an information search device which eliminates all the above-noted disadvantages peculiar to the prior art.

It is another object of the present invention to provide a device which is capable of automatically effecting the search for a document unit comprising a series of associated information frames.

It is still another object of the present invention to provide a device which is capable of effecting both the search for a frame unit and the search for a document unit to thereby search for a desired frame or a desired group of frames.

These and other objects of the present invention will become fully apparent from the following detailed description of a specific embodiment thereof taken in conjunction with the accompanying drawings.

DESCRIPTION OF THE PREFERRED EMBODIMENTS

Figure 1:
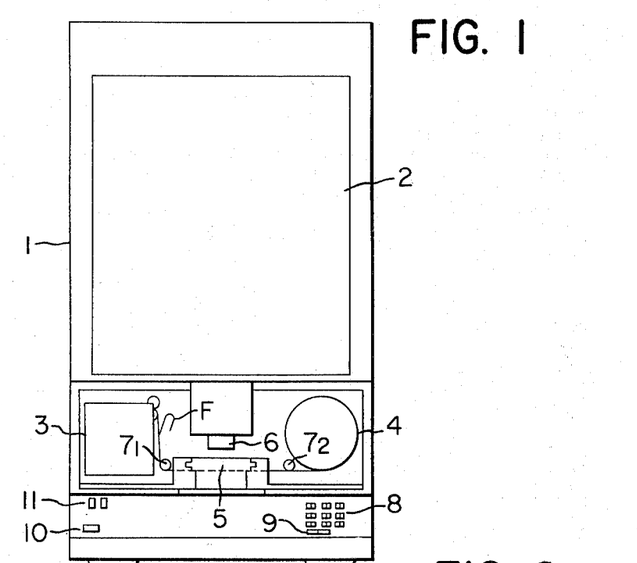
FIG. 1 is a front view of a reader-printer equipped with an information search device according to a specific embodiment of the present invention.

Referring to FIG. 1, there is shown a reader-printer equipped with an information search device according to an embodiment of the present invention. The reader-printer includes a main body 1, a screen 2 for viewing an image projected thereon from a film, a film supply magazine 3 containing therein a roll of long-footage microfilm, and a take-up reel 4. The reader-printer further includes a film guide 5 providing a passage for microfilm F, a projection lens 6 disposed above the film guide 5, and guide rollers $7_1$ and $7_2$.

Figure 3:
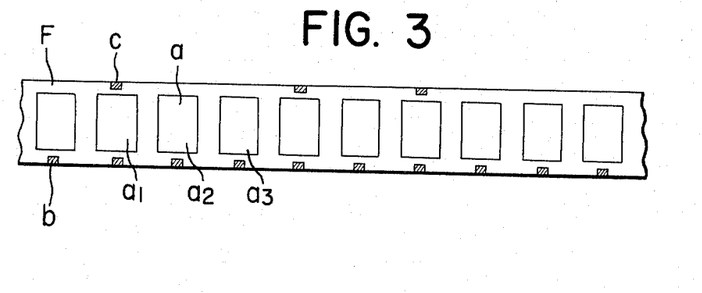
FIG. 3 is a plan view of a microfilm usable with the present invention.

On the front of the main body 1, there is provided a group of search buttons 8 for entering search numbers, a switch 9 for changing over the mode of operation between frame search and document search, a power switch 10 and a print button 11. Within the main body 1, as is shown in FIG. 3, there is disposed a light source system 16 including a light source or lamp 12, condenser lenses 13 and 14 and a mirror 15. A light beam from the lamp 12 may be thrown upon the microfilm F through the system. Within the upper portion of the main body 1, there is disposed a pivotable mirror 17 and a print device 18. The light beam may be passed through the microfilm F and further through the projection lens 6, and then reflected by the mirror 17 for projection upon the screen 2. Thus, the image recorded in the film placed in the irradiated position may be magnifiedly projected upon the screen 2 so as to be viewed thereon.

If the mirror 17 is pivoted towards the screen 2 into a position as indicated by broken lines 17′, the image of the film may be magnifiedly projected and printed upon a sheet of sensitive paper placed in the print device 18 at the exposure position thereof.

Figure 2:
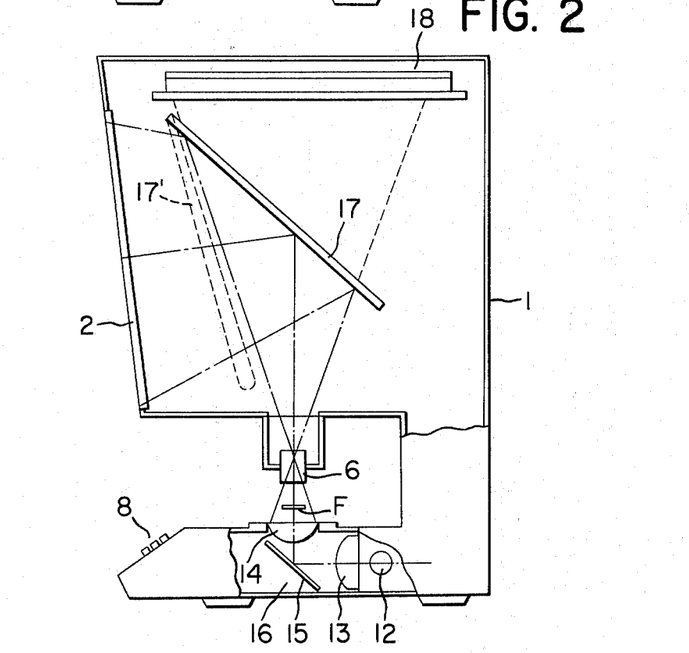
FIG. 2 is a partly broken-away side view of the reader-printer shown in FIG. 1.

FIG. 2 shows a portion of the microfilm F used with the present invention. As shown there, the long-footage microfilm F has recorded thereon a series of information frames $a$, frame index marks $b$ corresponding to respective ones of the information frames, and document index marks $c$ corresponding to series of associated information frames. The frame index marks $b$ and the document index marks $c$ are disposed on the opposite side margins of the film lengthwise thereof, and all these marks are formed with a uniform size. Each of the document index marks c is located adjacent to a first one of a group of associated frames. In FIG. 3, for example, it is located adjacent to the frame $a_1$ which is the first one of its associated frames $a_1$, $a_2$ and $a_3$ forming one group of document information.

Figure 4:
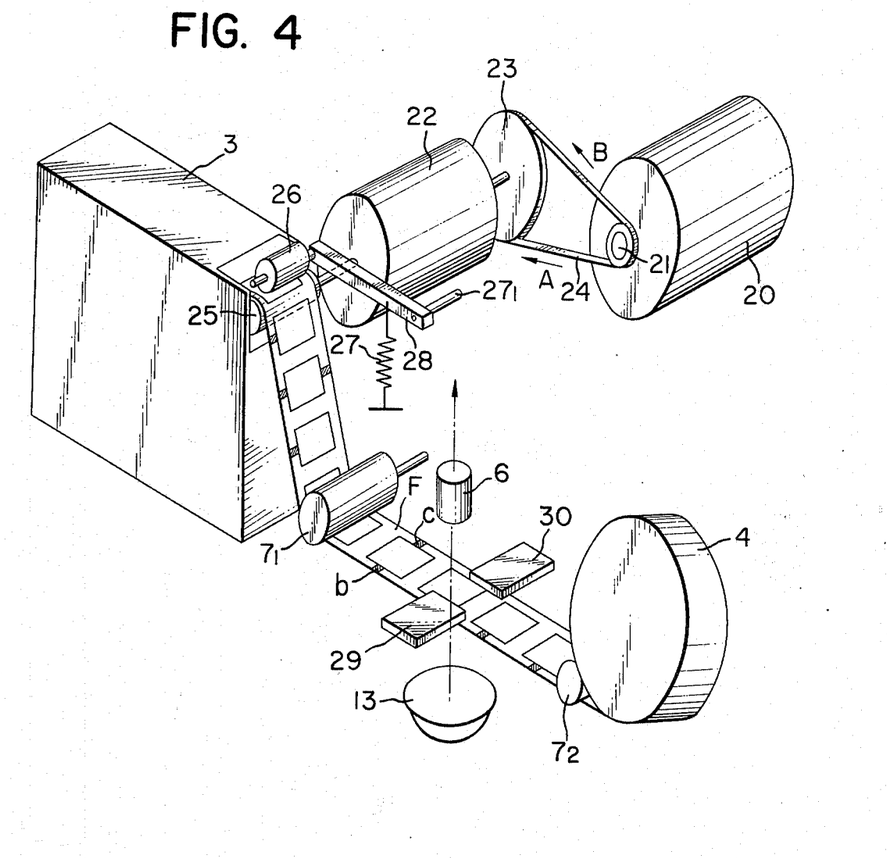
FIG. 4 is a perspective view showing the essential portions of the specific embodiment shown in FIG. 1.

FIG. 4 shows transport means in the above-described reader. A drive motor 20 has a rotary shaft on which a pulley 21 is mounted. A brake mechanism 22 has a pulley 23 connected thereto. An endless belt 24 is extended between the pulleys 21 and 23. A capstan roller 25 and a pinch roller 26 are provided adjacent to the film outlet port of the film supply magazine 3 so that rotation of the capstan roller 25 may cause the film within the magazine to be fed outwardly therefrom. The drive of the drive motor 20 may be transmitted through the brake mechanism 22 to the capstan 25. When the brake mechanism is operated by a signal to be described, the capstan roller 25 may be stopped from rotating and the film may thus be stopped. The pinch roller 26 is rotatably mounted on one end of an arm 28 biased by a spring 27 for counter-clockwise rotation about a pivot shaft $27_1$. The pinch roller 26 is normally urged into contact with the capstan roller 25 by the force of the spring 27. A first photoelectric converter element 29 and a second photoelectric converter element 30 are disposed on the opposite sides of the film passage, respectively. The first converter element 29 receives a light beam passed through frame index marks while the second converter element 30 receives a light beam passed through document index marks so that each of these elements converts optical signals into electrical signals.

Figure 5:
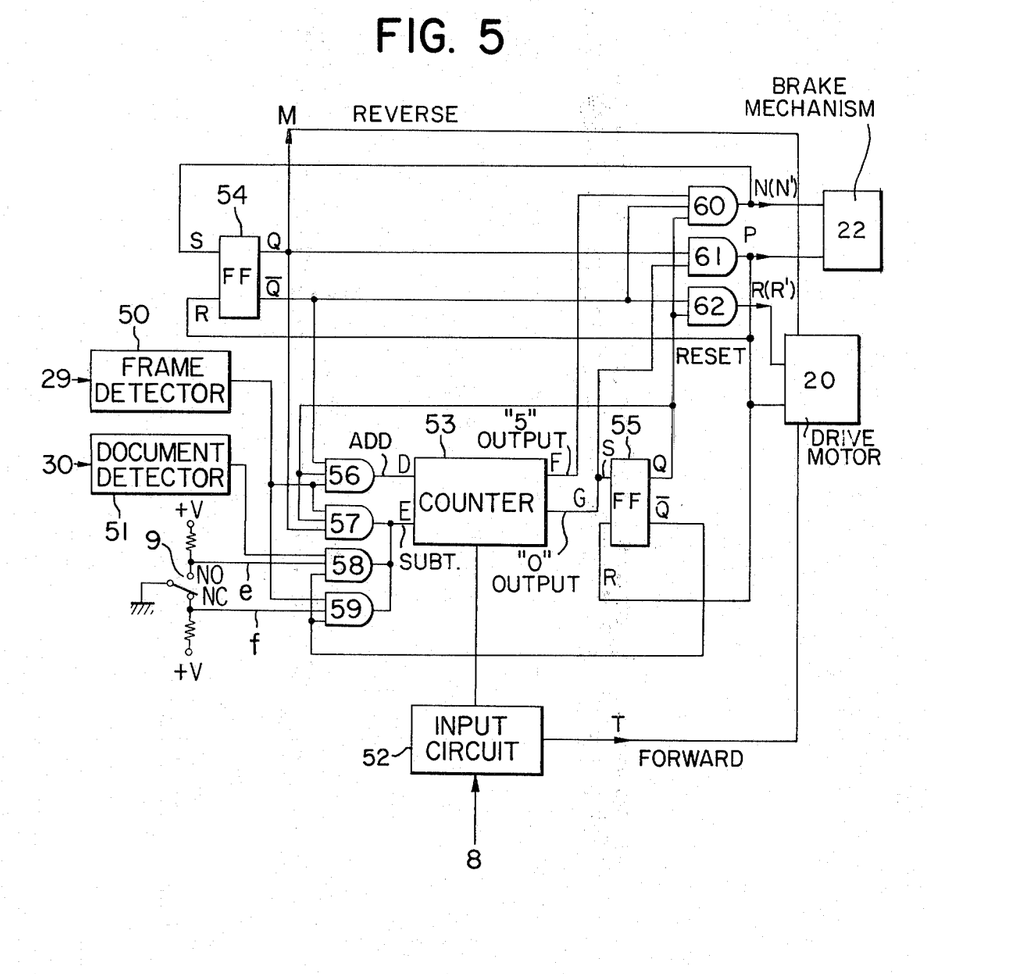
FIG. 5 is a block diagram of the control circuit in the specific embodiment shown in FIG. 1.

FIG. 5 shows a control circuit for effecting a search operation. This control circuit includes a frame detector circuit 50 for receiving the detection signals supplied from the first photoelectric converter element 29, a document detector circuit 51 for receiving the detection signals supplied from the second photoelectric converter element 30, an input circuit 52 for receiving the search number entered through the search button group 8, a counter 53, flip-flops 54 and 55, AND gates 56–62, and switch 9 for changing over the mode of operation between frame search and document search. The output of the AND gate 56 is connected to one input line D of the counter 53 and the outputs of the AND gates 57, 58, 59 are connected to the other input line E of the counter 53. On the other hand, one output line F of the counter 53 is connected to the input of the AND gate 60 while the other output line G of the counter 53 is connected both to the input of the AND gate 61 and the set input terminal of the flip-flop 55. The set output terminal of the flip-flop 55 is connected to the inputs of the AND gates 56, 57, 60 and 62, respectively, and the reset output terminal of the flip-flop 55 is connected to the inputs of the AND gates 58 and 59, respectively. The output of the AND gate 60 is connected to the set input terminal of the flip-flop 54, and to the brake control system 22. The set output terminal of the flip-flop 54 is connected to the inputs of the AND gates 57 and 61, respectively, and the reset output terminal of the flip-flop 54 is connected to the inputs of the AND gates 56, 60 and 62 respectively. The output of AND gate 61 is connected to the reset terminals of flip-flops 54 and 55, to the brake control system 22, and to the motor drive system 20. Also connected with the motor drive system 20 are the output from AND gate 62, the set output from flip-flop 54 and the input circuit 52.

When the movable contact of the switch 9 is engaged with the normally closed contact NC, a signal "1" is delivered to the input e of the AND gate 58 and a signal "0" is delivered to the input f of the AND gate 59. When the movable contact of the switch 9 is engaged with the normally open contact N0, a signal 0 is delivered to the AND gate 58 and a signal 1 is delivered to the AND gate 59.

When the first photoelectric converter element 29 has detected a frame index mark the detection signal 1 is led out of the frame detector circuit 50, and when the second photoelectric converter element 30 has detected a document index mark the detection signal 1 is led out of the document detector circuit 51. When no mark is detected, the detection signals produced by these detector circuits are 0. When the flip-flops 54 and 55 are in set conditions, the output signal from their set output terminals are 1 and the output signals from their reset output terminals are 1. Each of the AND gates is opened to paes the signal 0 when the input signal thereto is 1.

Figure 6:
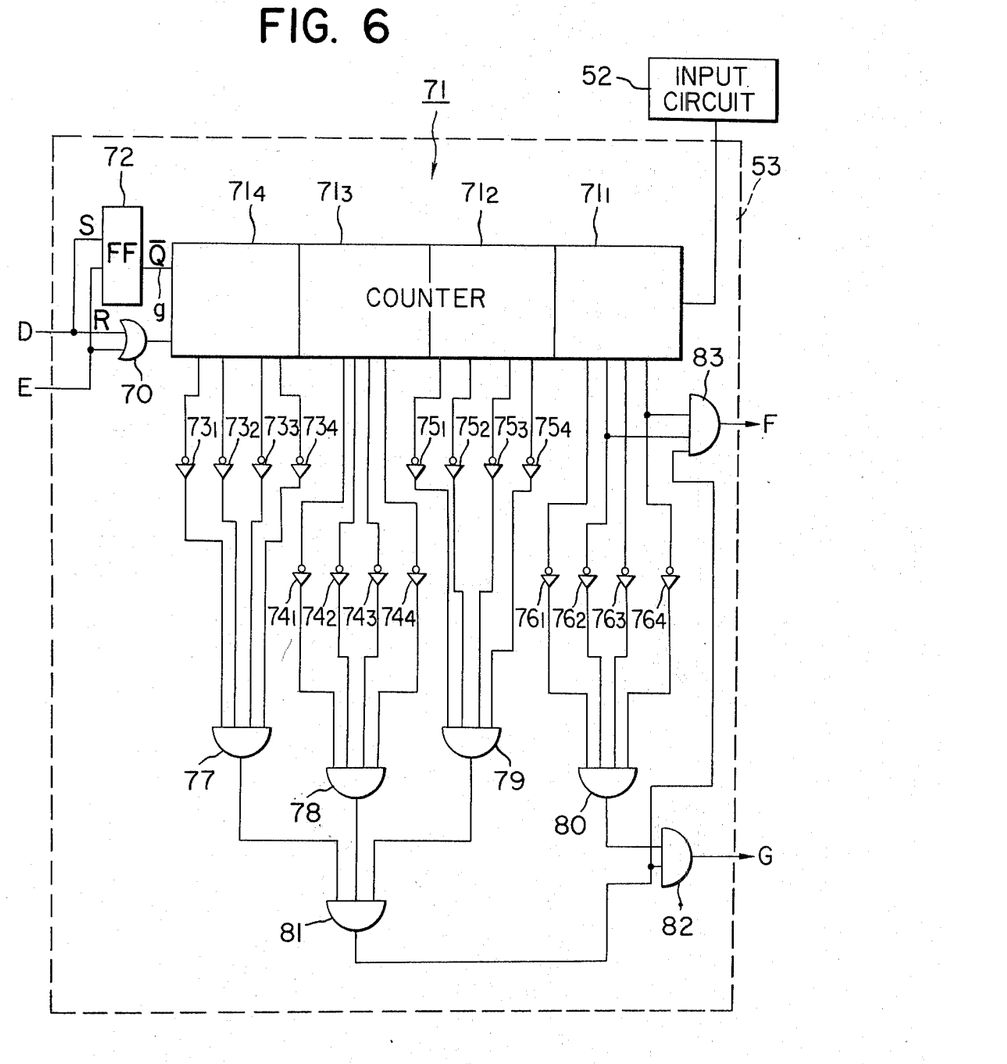
FIG. 6 is a diagrammatic representation of the electric circuit of the counter shown in FIG. 5.

FIG. 6 illustrates a specific form of the counter, which includes an OR gate 70 and a counter circuit 71 which is capable of counting numerical values of up to four digits, namely, the least significant digit $71_1$, the second least significant digit $71_2$, the third least significant digit $71_3$ and the most significant digit $71_4$. FIG. 6 further includes a flip-flop 72, inverters $73_1$–$73_4$, $74_1$–$74_4$, $75_1$–$75_4$ and $76_1$–$76_4$ and AND gates 77–83. The set input terminal of the flip-flop 72 is connected to the input line D, the reset input terminal of the flip-flop 72 is connected to the input line E, and the reset output terminal g of the same flip-flop is connected to the counter circuit 71. The AND gates 77, 78, 79 and 80 are gated to pass the signal 1 when the numerical values for the respective digits of the counter circuit are 0. The AND gate 83 is gated to pass the signal 1 when the numerical values for the second least significant digit to the most significant digit are 0 but the numerical value for the least significant digit is 5. When the signal passed to the input line D of the counter 53 is 1, the signal on the output line g of the flip-flop 72 is 0 to render the counter circuit 71 ready for addition. If the signal 1 is then introduced from the OR gate 70 into the counter circuit 71, this signal is added in the counter circuit 71. When the signal passed to the input line E is 1, the signal on the reset output terminal g of the flip-flop 72 is 1 to render the counter circuit 71 ready for subtraction. If the signal 1 is then introduced from the OR gate 70 into the counter circuit 71, this signal is subtracted in the counter circuit 71.

When a search number is introduced into the input circuit 52 by operating the search button group 8, the search number is progressively shifted leftwardly and set in the counter circuit 71. Before the search operation occurs, it should be understood in FIG. 5 that the flip-flops 54, 55 and 72 are in reset condition and accordingly, the signal on the reset output terminal g of the flip-flop 72 is 1 to render the counter circuit 71 ready for subtraction.

The search operation will now be described with respect to a specific example. It is assumed that a document unit comprising frames $a_1$, $a_2$ and $a_3$, for example, is to be searched for by the use of the film as shown in FIG. 3. The film F within the supply magazine 3 is first led out to pass through the film passage to the take-up reel 4 and the leading end portion of the film is entrained on the reel, whereafter the power switch button 10 is depressed. Subsequently, the movable contact of the change-over switch 9 is engaged with the normally closed contact NC (the position shown in FIG. 5) to change over the operation mode from frame search to document search. It is assumed that the number of document index marks $c$ from the start point to frame $a_1$ of the film, that is, the document number, is 20. When the search button group 8 is operated to enter the document number 20 into the input circuit 52, such number is set and stored in the counter circuit 71. Next, a search start button in the search button group 8 is depressed so that the input circuit 52 produces a motor driving signal T. This driving signal T energizes the motor 20 which in turn drives the belt 24 at a high speed in the direction of arrow A indicated in FIG. 4, so that the capstan roller 25 and accordingly the pinch roller 26 is rotated to transport the film at a high speed.

As the film transport progresses, the first and second photoelectric converter elements 29 and 30 detect a frame index mark $b$ and a document index mark $c$, respectively, whereupon the detection signals 1 are produced from the respective detector circuits 50 and 51. Since the flip-flop 55 is in reset condition and the movable contact of the change-over switch 9 is in engagement with the contact NC, the AND gate 58 is opened when the detection signal 1 resulting from the detection of the document index mark $c$ is delivered to the AND gate 58, and the signal is further supplied therefrom through the OR gate 70 to the counter circuit 71. Since the counter circuit 71 is then ready for subtraction, this signal is subtracted by the counter circuit 71 so that the numerical value 20 set in the counter circuit reduces to 19.

On the other hand, the detection signal 1 resulting from the detection of the frame index mark $b$ is delivered from the detector circuit 50 to the AND gates 56, 57 and 59, but these gates remain closed.

Each time the second photoelectric converter element 30 detects a document index mark $c$ in the moving film, the numerical value in the counter circuit 71 is subjected to a subtraction. When 20 detection signals have been successively delivered to the counter circuit 71, namely, when the document index marks $c$ from the start point to the frame $a_1$ of the film have been counted up, the numerical value in the counter circuit 71 reduces to 0. Thus, the numerical values for the digits $71_1, 71_2, 71_3$ and $71_4$ in the counter circuit 71 are 0, so that the AND gates 77, 78, 79 and 80 are opened to thereby open the AND gates 81 and 82. As a result, a signal 1 is produced from the AND gate 82 (i.e. from the output line G of the counter 53). This signal is delivered to the flip-flop 55 and to the AND gate 61, so as to set the flip-flop 55. Since the flip-flop 54 is in reset condition, the setting of the flip-flop 55 causes the AND gate 62 to be opened, and this gate produces a motor stop signal R. This motor stop signal R is delivered to the drive motor 20, which is thus deenergized to discontinue its revolution. Even after the drive motor 20 has been stopped from revolving, the capstan and pinch rollers 25 and 26 continue to rotate from inertia to permit the film to overrun beyond a predetermined mark detecting position after a predetermined document index mark has been detected.

On the other hand, the setting of the flip-flop 55 also causes the AND gate 58 to be closed, but since the flip-flop 54 is in reset condition, the detection signal 1 resulting from the detection of the frame index mark $b$ is delivered to the AND gate 56, which is thus opened to pass the signal through the OR gate 70 to the counter circuit 71. Since the AND gate 56 has thus been opened, the output signal of the flip-flop 72 is 0 to render the counter circuit ready for addition so that the signal 1 from the OR gate 70 is added in the counter circuit 71.

Each time the first photoelectric converter element 29 detects a frame index mark $b$ in the overrunning film, the numerical value in the counter circuit 71 is subjected to addition. After the overrunning of the film, when the numerical value for the least significant digit $71_1$ in the counter circuit 71 is 5 with 0 for the other digits, that is when the film has effected a five-frame overrun, a signal 1 is produced from the AND gate 83 (i.e. from the output line F of the counter 53). This signal is delivered to the AND gate 60, which is thereupon opened because the flip-flop 55 is in set condition and the flip-flop 54 is in reset condition, and thus the AND gate 60 produces a brake signal N. The signal N is delivered to the brake mechanism 22, which is thus rendered operative to stop the rotation of the capstan roller 25 and accordingly the movement of the film F. The brake signal N is also delivered to the flip-flop 54, which is thereby set to produce a signal 1 from the set output terminal thereof. This signal is delivered as a reversing signal M to the drive motor 20, which is thereby re-energized to drive the belt 24 now in the direction of arrow B at a low speed. At the same time, the setting of the flip-flop 54 also causes the AND gate 60 to be closed, thus deenergizing the brake mechanism 22. Thus, the film F is now transported in the opposite direction back into the supply magazine 3.

Since the flip-flops 54 and 55 are in set condition, a detection signal 1 resulting from the detection of a frame index mark $b$ in the backwardly moving film F is delivered to the AND gate 57, which is thereby opened to pass the signal through the OR gate 70 to the counter circuit 71. When this occurs, the output signal of the flip-flop 72 is 1 to render the counter circuit 71 ready for subtraction, so that the signal from the OR gate is subtracted by the counter circuit 71. Each time the first photoelectric converter element 29 detects a frame index mark $b$ in the backwardly moving film, the numerical value in the counter circuit 71 is subjected to subtraction.

After the backward movement of the film, when the numerical value in the counter circuit 71 is reduced to 0, that is, when the same number of frames as the number of overrun frames has been counted up, the AND gates 77, 78, 79 and 80 are opened to thereby open the AND gates 81 and 82 so that a signal 1 is produced from the AND gate 82 (i.e. from the output line G of the counter 53) and delivered to the AND gate 61. Since the flip-flop 54 is then in set condition, the AND gate 61 is opened to produce a termination signal P. The termination signal P is delivered to the drive motor 20 and to the brake mechanism 22, whereupon the motor 20 is deenergized to discontinue its drive while the brake mechanism 22 is rendered operative to stop the film from moving. The termination signal P of the AND gate is transmitted to the input terminals of the flip-flop circuits 54 and 55 to reset them. As a result, the control circuit is returned to its original position, that is, the position prior to the commencement of the searching action. Therefore, the searching operation is finished by the resetting of the flip-flop circuits 54 and 55, and simultaneously the device is placed in a position ready for the next searching operation. Thus, the film F is transported backwardly as much as it overran, and stopped with its frame $a_1$ disposed at a predetermined position.

In this manner, a predetermined document can be automatically searched for and the image of the frame $a_1$ may be projected upon the screen 2 for viewing or upon the print device 8 for printing.

Further, the present invention enables not only the above-described search for a desired document unit but also the search for a desired frame unit to be achieved.

To effect the frame search for using a microfilm F as shown in FIG. 3 or a film conventionally provided with frame index marks alone for respective frames, the movable contact of the switch 9 is connected to the normally open contact No to shift the change-over switch 9 from document search mode to frame search mode. This makes the AND gate 59 available in lieu of the AND gate 58 which was operated during the previously described document search. More particularly, the search button group 8 is depressed to enter a frame number for a desired frame through the input circuit 52 into the counter circuit 71 so as to set the frame number therein. Subsequently, a detection signal 1 results from the detection of a frame index mark $b$ in the moving film and is delivered to the AND gate 59, which is thus opened to pass the signal through the OR gate 70 to the counter circuit 71. Since the counter circuit 71 is ready for subtraction, the signal is subtracted in the counter circuit. Each time the first photoelectric converter element 29 detects a frame index mark in the moving film, the numerical value in the counter circuit 71 is subjected to subtraction. When the numerical value in the counter circuit 71 reduces to 0, the drive motor 20 is deenergized to discontinue its drive. From inertia, the film overruns without stopping. Thereafter, the operation proceeds in the same manner as described previously. Thus, frame search can be effected with the film as shown in FIG. 3 or the conventional film having frame index marks alone provided as marks.

In the embodiment of the present invention described above, the drive motor 20 is deenergized by a motor stop signal R when a predetermined number of marks has been counted up by the counter circuit 71, but during such time the drive motor may be reduced in speed instead of being deenergized.

This may be accomplished by reducing the speed of the drive motor 20 with the aid of a motor speed reduction signal R' corresponding to the motor stop signal R from the AND gate 62 when a predetermined number of marks has been counted up by the counter circuit 71. In this case, the deenergization of the drive motor 20 is done by a motor stop signal N' corresponding to the aforesaid brake signal N from the AND gate 60. This stop signal N' is also used to operate the brake mechanism 22.

When a predetermined mark has been detected, the film is caused to overrun but instead it may be immediately stopped if the film transport speed is low.

Although the present invention has been shown and described with respect to a specific embodiment thereof, it should be understood that the invention is not limited to the illustrated form but various modifications may be made therein without departing from the scope of the invention as defined in the appended claims.

We claim:
1. An information search device for retrieving data stored on a record strip having a series of information frames, frame index marks disposed correspondingly to each of said frames, document index marks disposed correspondingly to a group consisting of at least one frame, said document index marks and said frame index marks being arranged along the information frames at the opposite sides thereof, said device comprising:
   frame detector means (50) for detecting the frame index marks and for producing first pulse signals,
   document detector means (51) for detecting the document index marks and for producing second pulse signals;
   gate means (56, 57, 58) coupled to each of said detector means for selectively passing therethrough either the first pulse signals or the second pulse signals;
   entry means (52) for entering a document number corresponding to desired information;
   means (53) coupled to said entry means and said gate means for counting the signals which pass through said gate means (56, 57, 58), said counting means (53) having first and second output terminals and producing a first signal at said first terminal (G) when counting a number of the second pulse signals corresponding to said document number, for producing a second signal at said second terminal (F) when counting a first predetermined number of the first pulse signals after producing the first signal, and for producing a third signal at said first terminal (G) when counting a second predetermined number of the first pulse signals after producing the second signal;
   first control means (55) coupled to said counting means and to said gate means for controlling said gate means (56, 57, 58) in response to the signals produced from said counting means (53) at a particular time so that a selected one of said first and second pulse signals are passed through said gate means (56, 57, 58) subsequent to said particular time;
   driving means (20) for moving the record strip; and
   second control means (60, 61, 62, 54) coupled to said counter, said first control means and to said driving means to control movement of the record strip in response to the signals produced by said counting means so that said desired information is located at a predetermined position.

2. A device according to claim 1, further comprising means (9, 59) for retrieving a desired frame.

3. A device according to claim 1, wherein said counting means includes a counter for counting the pulse signals which have passed through said gate means, switch-over means for selectively causing said counting means to execute addition and subtraction, and means for reading a counted number to produce said first, second and third signals.

4. A device according to claim 1, wherein said driving means includes a reversible motor, and said device further comprises means (22) for stopping the movement of the record strip, said second controlling means producing a signal for decelerating the record strip in response to the first signal of said counting means, and producing a signal for reversing the movement of the record strip in response to the second signal of said counting means, and producing a signal for stopping the record strip in response to the third signal of said counting means.

5. A device according to claim 5, wherein said first predetermined number is equal to said second predetermined number.

6. An information search device for retrieving data stored on a record strip having a series of information frames, frame index marks disposed correspondingly to each of said frames, document index marks disposed correspondingly to a group consisting of at least one frame, said document index marks and said frame index marks being arranged along the information frames at the opposite sides thereof, said device comprising:
- frame detector means for detecting the frame index marks and for producing first pulse signals;
- document detector means for detecting the document index marks and for producing second pulse signals;
- gate means coupled to each of said detector means for selectively passing therethrough either the first pulse signals or the second pulse signals;
- entry means for entering a document number corresponding to desired information;
- means coupled to said entry means and said gate means for counting the signals which pass through said gate means, said counting means having first and second output terminals and producing a first signal at said first terminal when counting a number of the second pulse signals corresponding to said document number, and for producing a second signal at said second terminal when counting a predetermined number of the first pulse signals after producing the first signal;
- first control means coupled to said counting means and to said gate means for controlling said gate means in response to the signals produced from said counting means at a particular time so that a selected one of said first and second pulse signals are subsequently passed through said gate means, said first control means permitting only said second pulse signals to pass through said gate means before receiving the first signal of said counting means, and permitting only said first pulse signals to pass through said gate means after receiving the first signal of said counting means;
- driving means for moving the record strip; and
- second control means coupled to said counter, said first control means and to said driving means to control movement of the record strip in response to the signals produced by said counting means so that said desired information is located at a predetermined position.

7. An information search device for retrieving data stored on a record strip having a series of information frames, frame index marks disposed correspondingly to each of said frames, document index marks disposed correspondingly to a group consisting of at least one frame, said document index marks and said frame index marks being arranged along the information frames at the opposite sides thereof, said device comprising:
- frame detector means for detecting the frame index marks and for producing first pulse signals;
- document detector means for detecting the document index marks and for producing second pulse signals;
- gate means coupled to each of said detector means for selectively passing therethrough either the first pulse signals or the second pulse signals;
- entry means for entering a document number corresponding to desired information;
- means coupled to said entry means and said gate means for counting the signals which pass through said gate means, said counting means having first and second output terminals and producing a first signal at said first terminal when counting a number of the second pulse signals corresponding to said document number, for producing a second signal at said second terminal when counting a first predetermined number of the first pulse signals after producing the first signal, and for producing a third signal at said first terminal when counting a second predetermined number of the first pulse signals after producing the second signal;
- first control means coupled to said counting means and to said gate means for controlling said gate means in response to the signals produced from said counting means at a particular time so that a selected one of said first and second pulse signals are subsequently passed through said gate means, said first control means permitting only said second pulse signals to pass through said gate means before recieving the first signal of said counting means, and permitting only said first pulse signals to pass through said gate means after receiving the first signal of said counting means;
- driving means for selectively moving the record strip in forward and backward directions;
- means for stopping the movement of the record strip; and
- second control means coupled to said first control means, to driving means, to said stopping means and to said counting means, said second control means producing a signal for decelerating movement of the record strip in response to the first signal of said counting means, for producing a signal for reversing the movement of the record strip in response to the second signal of said counting means, and for producing a signal for stopping the record strip in response to the third signal of said counting means.

8. An information search device for retrieving data stored on a record strip having a series of information frames, frame index marks disposed correspondingly to a group consisting of at least one frame, said document index marks and said frame index marks being arranged along the information frames at the opposite sides thereof, said device comprising:
- frame detector means for detecting the frame index marks and for producing first pulse signals;
- document detector means for detecting the document index marks and for producing second pulse signals;
- gate means coupled to each of said detector means for selectively passing therethrough either the first pulse signals or the second pulse signals;
- entry means for entering a document number corresponding to desired information;
- counter means coupled to said gate means and said entry means for counting the signals which pass through said gate means;
- means coupled to said counter means for producing output signals when predetermined numbers are in said counter means;

first control means coupled to said signal producing means and to said gate means for controlling said gate means in response to the output signals of said signal producing means;
driving means for moving the record strip; and
second control means coupled to said signal producing means, said first control means and to said driving means to control movement of the record strip in response to the output signals produced by said signal producing means so that said desired information is located at a predetermined position.

* * * * *

UNITED STATES PATENT AND TRADEMARK OFFICE
CERTIFICATE OF CORRECTION

PATENT NO. : 3,999,846
DATED : December 28, 1976
INVENTOR(S) : YOSHIHARU SONE, et al.

It is certified that error appears in the above-identified patent and that said Letters Patent are hereby corrected as shown below:

Column 2, line 43, change "Fig. 3" to -- Fig 2 --; line 61, change "Fig. 2" to -- Fig. 3 --.

Column 4, line 21, change "1" to -- 0 --; line 22, change "paes" to -- pass --; same line, change "0" to -- 1 --.

Column 7, line 14, change "search for" to -- search by --.

Column 9, line 3, change "claim 5" to -- claim 1 --.

Column 10, line 36, before "driving" insert -- said --; line 48, after "to" insert -- each of said frames, document index marks disposed correspondingly to --.

Signed and Sealed this

Seventh Day of June 1977

[SEAL]

Attest:

RUTH C. MASON
*Attesting Officer*

C. MARSHALL DANN
*Commissioner of Patents and Trademarks*